(12) United States Patent
Linzer

(10) Patent No.: US 7,660,356 B2
(45) Date of Patent: Feb. 9, 2010

(54) COMPRESSED VIDEO FORMAT WITH PARTIAL PICTURE REPRESENTATION

(75) Inventor: Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 1570 days.

(21) Appl. No.: 10/277,698

(22) Filed: Oct. 22, 2002

(65) Prior Publication Data

US 2004/0066851 A1 Apr. 8, 2004

Related U.S. Application Data

(60) Provisional application No. 60/415,943, filed on Oct. 2, 2002.

(51) Int. Cl.
*H04N 7/18* (2006.01)
(52) U.S. Cl. .............. 375/240.25; 375/240.26
(58) Field of Classification Search ........ 375/240.01–240.29; 348/473, 476, 552, 556; 382/154; 386/46; 341/107; *H04N 7/12*
See application file for complete search history.

(56) References Cited

U.S. PATENT DOCUMENTS

| 5,353,065 | A  | * | 10/1994 | Katsumata et al. .......... 348/556 |
| 5,737,026 | A  | * | 4/1998  | Lu et al. ..................... 348/473 |
| 5,808,689 | A  | * | 9/1998  | Small ......................... 348/476 |
| 6,300,980 | B1 | * | 10/2001 | McGraw et al. .............. 348/552 |
| 6,400,767 | B1 | * | 6/2002  | Nuber et al. ........... 375/240.26 |
| 6,408,096 | B2 | * | 6/2002  | Tan ............................. 382/232 |
| 6,463,102 | B1 |   | 10/2002 | Linzer ................... 375/240.29 |
| 6,477,267 | B1 | * | 11/2002 | Richards ..................... 382/154 |
| 2001/0017892 | A1 | * | 8/2001 | Barton et al. .......... 375/240.26 |
| 2002/0196853 | A1 | * | 12/2002 | Liang et al. ............ 375/240.12 |
| 2003/0228127 | A1 | * | 12/2003 | Buxton ........................ 386/46 |
| 2004/0150540 | A1 | * | 8/2004  | Winger ....................... 341/107 |

OTHER PUBLICATIONS

"CCIR Rec. 601-2: Encoding Parameters of Digital Television For Studios", 1990, pp. 1-2.
"Joint Video Team (JVT) of ISO/IEC MPEG and ITU-T VCEG", Sep. 19, 2002, pp. 1-200.

* cited by examiner

*Primary Examiner*—Andy S Rao
(74) *Attorney, Agent, or Firm*—Christopher P. Maiorana, PC

(57) ABSTRACT

A method for decoding a digital video bit-stream comprising the steps of (A) receiving the digital video bit-stream having (i) a first portion containing image information and (ii) a second portion containing overscan information and (B) extracting the overscan information from the video bit-stream. The overscan information describes a shape of a overscan region absent from the digital video bit-stream.

29 Claims, 3 Drawing Sheets

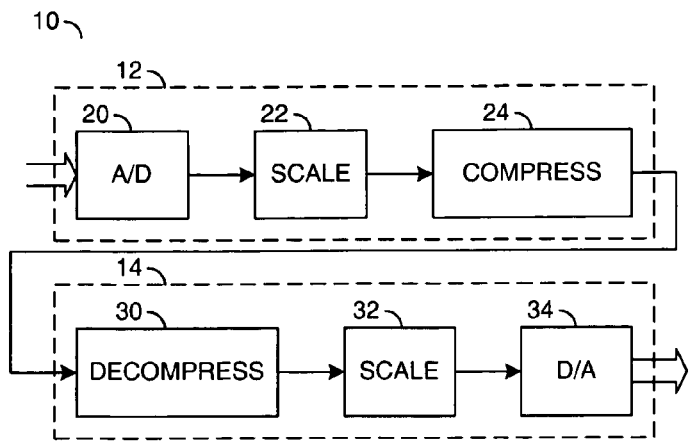
(CONVENTIONAL)
FIG. 1

COMPRESSED VIDEO FORMAT WITH PARTIAL PICTURE REPRESENTATION

This application claims the benefit of U.S. Provisional Application No. 60/415,943, filed Oct. 2, 2002 and is hereby incorporated by reference in its entirety.

FIELD OF THE INVENTION

The present invention relates to video compression coding/decoding generally and, more particularly, to a method and/or architecture for implementing a compressed video format with partial picture representation.

BACKGROUND OF THE INVENTION

Compression of digital video data is needed for many applications. Transmission over limited bandwidth channels such as direct broadcast satellite (DBS) and storage on optical media (i.e., DVD, CD, etc.) are typical examples of compressed data. In order to achieve efficient compression, complex computationally intensive processes are used for encoding (or compressing) and decoding (or decompressing) digital video signals. For example, even though MPEG-2 is known as a very efficient method for compressing video, more efficient compression standards such as H.264 are being developed. See, for example, document JVT-E022d7 titled "Editor's Proposed Draft Text Modifications for Joint Video Specification (IUT-T Rec. H.264 ISO/IEC 14496-10 AVC), Draft 7" published Sep. 19, 2002 by the Joint Video Team (JVT) of ISO/IEC MPEG and ITU-T VCEG, Berlin, Germany, which is hereby incorporated by reference in its entirety.

Referring to FIG. 1, a conventional coding/decoding system 10 is shown. The system 10 comprises an encoder 12 and a decoder 14. The encoder 12 comprises an analog to digital converter 20, a scaler 22 and a compression circuit 24. The decoder 14 comprises a decompression circuit 30, a scaler circuit 32 and a digital to analog converter circuit 34.

The encoder 12 scales an entire image before compression. The decoder 14 scales the image after decompression. For example, the A/D converter 20 generates an image having 720×480 pixels (e.g., in International Radio Consultative Committee (CCIR) format). The encoder 12 scales the image horizontally to 544×480 pixels (i.e., a factor of about 75%). The decoder 14 receives the image and rescales to 720×480 pixels before generating a video signal via the converter 34. In another example, the encoder 12 also scales the image to 544×480, but the decoder 14 scales the image to 1920×1080 pixels before the D/A conversion to display the image on a high definition (HDTV) monitor (not shown).

Another apparatus, disclosed in U.S. Pat. No. 6,463,102, modifies one or more edges of an image prior to encoding to make the encoding more efficient. An edge processor alters the image by converting some of the pixels at the image edges to black, blurring the image edges, and/or copying rows or columns of pixels multiple times on the image edges. Through the edge processing, the modified image retains the same size as the original image. The apparatus then encodes and transmits the modified image.

It would be desirable to provide a method and/or apparatus for improving encoding/decoding efficiency by not encoding/decoding an overscan portion from an encode/decode bit-stream.

SUMMARY OF THE INVENTION

One aspect of the present invention concerns a method for decoding a digital video bit-stream comprising the steps of (A) receiving the digital video bit-stream having (i) a first portion containing image information and (ii) a second portion containing overscan information and (B) extracting the overscan information from the video bit-stream. The overscan information describes a shape of an overscan region absent from the digital video bit-stream.

Another aspect of the present invention concerns a method for encoding a digital video bit-stream comprising the steps of (A) placing information into the digital video bit-stream having (i) an overscan region in an image and (ii) a picture region in the image, wherein the overscan region is absent from the digital video bit-stream and the picture region is explicitly represented in the digital video bit-stream and (B) presenting the digital video bit-stream containing information to reconstruct at least one image.

The objects, features and advantages of the present invention include providing a compressed video format that may (i) implement partial picture representation to improve encoding/decoding efficiency, (ii) be implemented without transmitting a large part of the image for intended displays having a large overscan area, (iii) use more bits for the visible part of the image, and/or (iv) use less compression for the visible part of an image.

BRIEF DESCRIPTION OF THE DRAWINGS

These and other objects, features and advantages of the present invention will be apparent from the following detailed description and the appended claims and drawings in which:

FIG. 1 is a diagram of a conventional coding/decoding system;

DETAILED DESCRIPTION OF THE PREFERRED EMBODIMENTS

Figure 2:
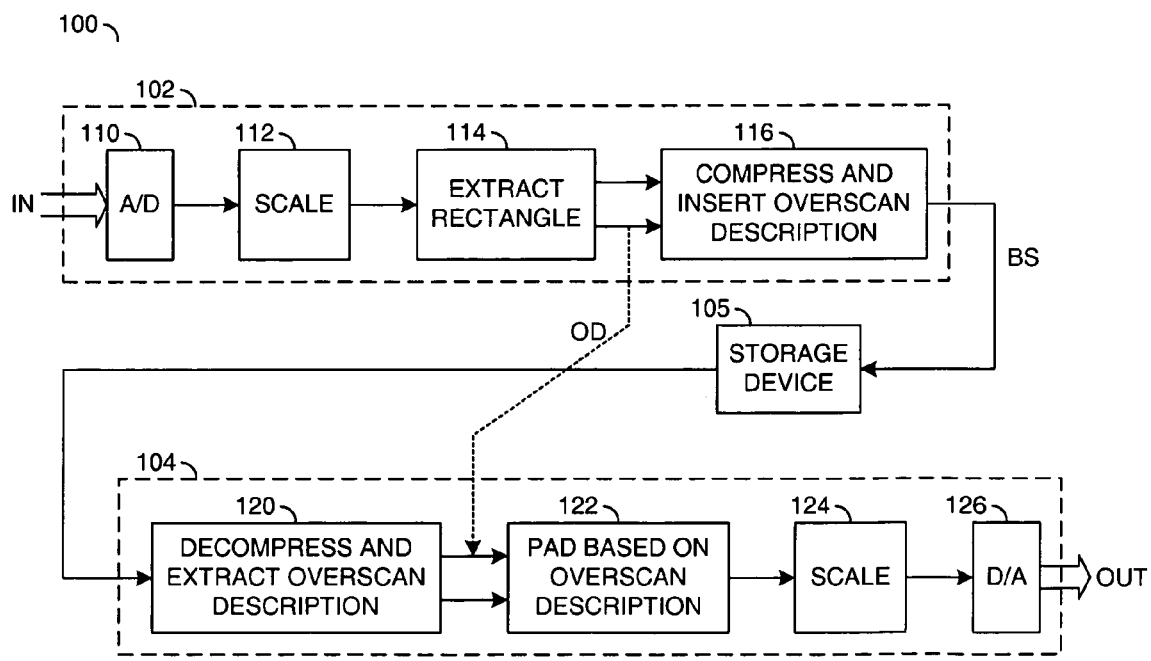
FIG. 2 is a diagram of coding/decoding system in accordance with a preferred embodiment of the present invention.

The present invention provides a method and/or apparatus for improving encoding/decoding efficiency in overscanned images. Compared with conventional approaches that code an entire image, the present invention may be implemented to code only a sub-rectangle (or portion or region) of an image. Information either (i) in the bit-stream (e.g., in-band) or (ii) external to the bit-stream (e.g., out-of-band) may be transmitted to describe a relationship of the sub-rectangle to the entire image. In one example, a sub-rectangle of size 656 pixels by 448 pixels may be sent. Other information may be provided to indicate that the full image resolution may be 720×480 pixels. The syntax may specifically indicate to fill the full image (e.g., 720×480 pixels) by centering the coded (or picture) 656×448 pixels a distance of 16 pixels from the top, bottom, left and right from the edges of the 720×480 pixel image. The particular distances may be represented (or encoded) in the bit-stream and may be different for each edge with one or more overscan parameters.

A decoder connected to a display with overscan (e.g., a commercial television) may pad the smaller picture image (or region) with a padded (or overscan) region to obtain the full sized image (or frame). The padded image may be a reconstructed image that has been extended by the overscan parameters. The decoder may optionally scale the padded image to a different resolution. The result may be sent to a digital to analog (D/A) converter. In cases where some of the non-coded part of the image may be inside the underscan (e.g., viewable) area, the image may be extended to avoid making the non-coded areas annoying. In one example, the outermost rows or columns of the coded (or picture) region may be copied into the padded (or overscan) region to provide the padding. A decoder connected to a display without overscan (e.g., a window on a computer display) may display the smaller picture image.

With overscan, a video signal, whether analog or digital, may have both a viewable region and an overscan region (to be described in more detail in connection with FIGS. 3 and 4). The overscan region may contain part of the picture that is not normally viewed. For example, a CCIR-601 bit-stream is a standard for representing uncompressed digital video. See, for example, CCIR Rec. 601-2, "Encoding Parameters of Digital Television for Studios" (1990), published by the International Telecommunication Union, Geneva, Switzerland, which is hereby incorporated by reference in its entirety. The active region of a CCIR-601 bit-stream may be 720 pixels wide and 486 rows high. After being converted to an analog signal and displayed on a typical monitor, only about 648 pixels wide by about 440 lines may be visible. The exact range of the visible region generally depends on the characteristics of the particular display device. Professional video monitors typically have an under-scan feature. When the under-scan feature is activated, the image may be shrunk so the overscan region may be seen.

In a mixed display environment, a signal may be compressed and later decompressed and displayed on various monitors. In one example, a movie may be compressed and placed on an optical disk (e.g., DVD, CD, etc.). The optical disk may then be played back either on a consumer television set or a computer. When played back on some monitors, such as a consumer television, the overscan region may not be viewable. When played back on a computer, the entire decoded image is typically displayed in a window on the computer monitor or on the entire monitor without any overscan.

Referring to FIG. 2, a system 100 is shown in accordance with a preferred embodiment of the present invention. The system 100 generally comprises an encoder 102, a decoder 104 and an optional storage device 105. The encoder 102 generally receives an input signal (e.g., IN). The decoder generally presents an output signal (e.g., OUT). The encoder 102 generally presents a bit-stream (e.g., BS) to the decoder 104 and/or the storage device 105 across a medium. The storage device 105 may also present the bit-stream BS to the decoder 104. The system 100 may be configured such that the encoder 102 presents an overscan description (e.g., OD) to the decoder 104 outside the bit-stream BS.

The encoder 102 generally comprises a block (or circuit) 110, a block (or circuit) 112, a block (or circuit) 114 and a block (or circuit) 116. The various blocks (e.g., 110, 112, 114 and 116) of the decoder 102 may each, either individually or collectively, add data and/or otherwise modify information ultimately carried by the bit-stream BS. The block 110 may be implemented as an analog to digital converter. The analog to digital converter block 110 may convert the incoming video signal IN into a digitized or uncompressed video signal. The video signal IN may convey images or frames containing the picture region normally viewed and the overscan region normally not viewed.

The block 112 may be implemented as a scaler. The scaler block 112 may scale the digitized video signal to generate a scaled uncompressed video signal. The scaled uncompressed video signal may also convey the picture region and the overscan region. Horizontal and vertical scale factors used in the scaling operation may be smaller than unity, unity, or greater than unity.

The block 114 may be implemented to extract a rectangle (e.g., a portion of the image containing image information) from the scaled uncompressed video signal while in a first mode. The rectangle may represent a picture (or coded) region of the original image that may be eventually displayed. A description of the extracted rectangle may include image information. The block 114 may also separate the image into the picture region and an overscan (or padded) region. The extraction block 114 generally transforms the scaled uncompressed video signal into a cropped video signal. The extraction block 114 may also generate the overscan description OD while in one (e.g., first) mode. While in another (e.g., second) mode, the extraction block 114 may pass the scaled uncompressed video signal through to the block 116 unchanged.

The block 116 may be implemented as a compression circuit. The compression block 116 may compress the cropped video signal into the digital video bit-stream BS. The compression block 116 may also multiplex or insert the overscan information into the bit-stream BS for presentation to the decoder 104, if the overscan information is available (e.g., the first mode). The compression block 116 may compress the full frames (or images) of the video signal while in the second mode. The image information generally contains information about the image that may be explicitly represented in the bit-stream BS. The overscan information generally contains information about the overscan region. Therefore the overscan region may be absent from, or not explicitly represented in the bit-stream BS.

The decoder 104 generally comprises a block (or circuit) 120, a block (or circuit) 122, a block (or circuit) 124 and a block (or circuit) 126. The block 120 may be implemented as a decompression circuit that may extract the overscan information and the picture region conveyed by the bit-stream BS. The block 120 may also decompress the picture region to generate a decompressed video signal. The block 122 may pad or otherwise modify the decompressed video signal images based on the overscan information. A resulting padded video signal may convey the reconstructed picture region and a newly generated overscan region. The block 124 may be implemented as a scaler circuit configured to adjust the size of the image contained in the padded video signal. The scaler block 124 may generate a digital video signal. The block 126 may be implemented as a digital to analog converter circuit to convert the digital video signal into an analog video signal.

In one example, the decoder 104 may pad the extracted rectangle based on the information in the bit-stream BS after decoding the images. Typically, the region not in the extracted rectangle will correspond to the overscan region. In another example, the decoder 104 may simply ignore the overscan description in the bit-stream BS. For example, if the decoder 104 is connected to a television (not shown) with overscan, the decoder 104 may pad the extracted picture region. If the decoder 104 is connected to a computer (not shown), the decoder 104 may ignore the overscan information.

In one example, after scaling each image or frame to 544×480 pixels, the encoder 102 may extract a window around the picture region having a size of 496×432 pixels. The decoder 104 may pad the reconstructed image to 544×480 pixels before scaling. Since the same up-sampling ratio may be used for the padding, the padding does not generally introduce loss of image fidelity. For a display with overscan, there may be no reduction in the quality of the viewed image. Since the bit-stream BS of the present example contains information on how to reconstruct images of size 496×432 pixels, 18% fewer pixels may be needed as compared with a conventional bit-stream. Fewer pixels allow either a lower bit-rate may be used for the bit-stream BS and/or fewer compression artifacts may be noticeable because more bits are used per pixel that is sent. The order of scaling and/or extracting at the encoder 102 and/or padding and scaling at the decoder 104 may be modified to meet the design criteria of a particular implementation. Also, scaling at the encoder 102 or decoder 104 may be skipped completely if appropriate.

Figure 3:
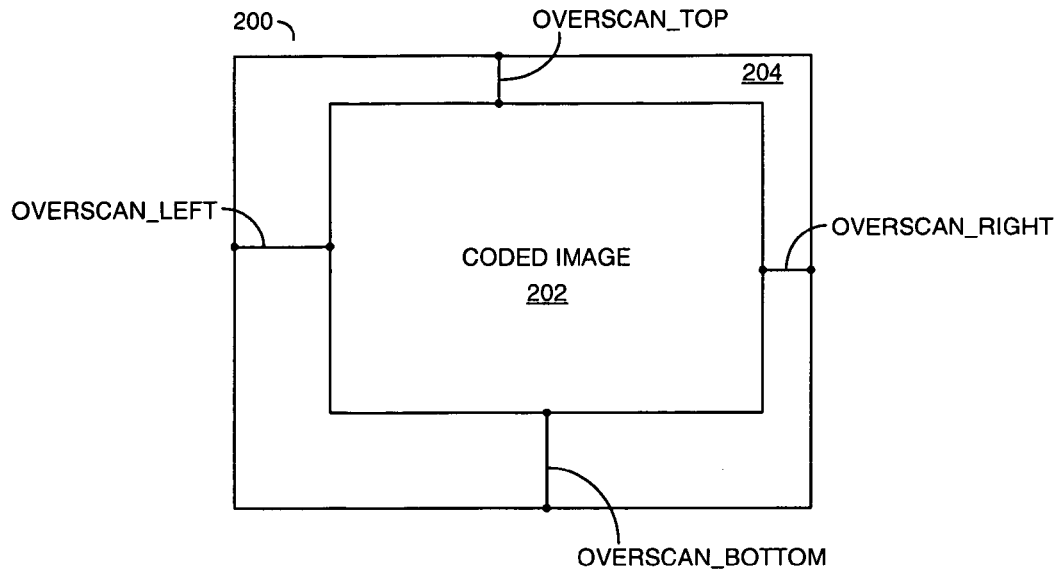
FIG. 3 is a diagram of an image illustrating overscan information.

Referring to FIG. 3, an example of an image (or frame) 200 is shown. The image 200 generally comprises a coded image (or picture region) 202 and an overscan image (or overscan region) 204. The image 200 may be referred to as a padded image. Overscan information (or overscan parameters) may be represented as four integers including (i) OVERSCAN_LEFT (e.g., the number of pixel columns to the left of the coded image that are not coded), (ii) OVERSCAN_RIGHT (e.g., the number of pixel columns to the right of the coded image that are not coded), (iii) OVERSCAN_TOP (e.g., the number of pixel rows on top of the coded image that are not coded), and (iv) OVERSCAN_BOTTOM (e.g., the number of pixel rows on the bottom of the coded image that are not coded).

In another embodiment, the four overscan parameters may define an area of the overscan region. For example, the OVERSCAN_LEFT, OVERSCAN_RIGHT, OVERSCAN_TOP and OVERSCAN_BOTTOM parameters may determine heights and widths of a left portion, a right portion, a top portion and a bottom portion of the overscan region, respectively. The overscan parameters may also define a shape of the overscan region. For example, the overscan parameters may provide an offset of the outer edges of the overscan region as measured from each edge of the pattern region. In another embodiment, the inner edges of the overscan region may be measured relative to the outer edges of the full image or frame. Other overscan descriptions may be implemented to meet the design criteria of a particular application.

Referring to TABLE 1, a way of sending the overscan parameters from the encoder 102 to the decoder 104 may be as part of the Video Usability Information (VUI) header in H.264. The syntax is shown in the following TABLE 1:

TABLE 1

| OVERSCAN_INFO | u(1) |
|---|---|
| IF (OVERSCAN_INFO) { | |
| OVERSCAN_LEFT | ue(v) |
| OVERSCAN_RIGHT | ue(v) |
| OVERSCAN_TOP | ue(v) |
| OVERSCAN_BOTTOM | ue(v) |
| } | |

In TABLE 1, the same basic terminology is used as in the 1-1.264 specification. For example, (i) u(l) may represent one overscan parameter as an unsigned integer of length 1 bit and (ii) ue(v) may represent another overscan parameter as an unsigned integer Exp-Golumb-coded syntax element with left bit first. If a flag (e.g., OVERSCAN INFO) is set to 0, the parameters OVERSCAN_LEFT, OVERSCAN_RIGHT, OVERSCAN_TOP, and/or OVERSCAN_BOTTOM may not be sent and instead all may take on the default value of zero. Another way of sending the overscan parameters may be as part of pan-and-scan fields mentioned in H.264. In one example, the overscan parameters may be transmitted separately from the bit-stream BS.

Padding of the coded image 202 within the overscan image 204 may be implemented in a number of ways. In one example, each image may be decoded into a buffer that has space for the overscan area or region, without necessarily filling the overscan area with any particular data. The buffering method may be simple and may work acceptably if the overscan region is not visible when the reconstructed video signal is displayed.

Figure 4:
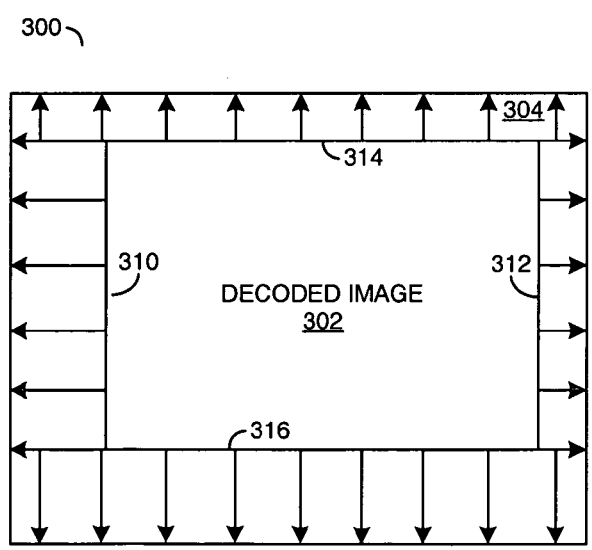
FIG. 4 is a diagram of an image illustrating a decoded image in accordance with a preferred embodiment of the present invention.

Referring to FIG. 4, an image 300 is shown. The image 300 generally comprises a decoded image (or region or picture region) 302 and an overscan image (or region) 304. The image 300 may be referred to as a padded image (or frame). The left-most column 310 of the picture region 302 may be copied to the left, the right-most column 312 of the picture region 302 may be copied to the right, the top-most row 314 of the picture region 302 may be copied to the top, and the bottom-most row 316 of the picture region 304 may be copied to the bottom. For interlaced video, the copying may be done either on each frame or on each field. More generally, any method may be used that uses pixel values within the picture region to fill the edge of the image.

Padding the decoded picture or image may be used when some of the (e.g., nominal) overscan region 304 will or might appear on the screen. Padding the coded image may be performed if the display is not well calibrated, or if the encoder 102 is aggressive in setting the overscan parameters. In one example, such as for a CCIR-601 signal, about 648×440 pixels out of 720×480 pixels are in the picture region 302. The encoder 202 may be arranged to encode only 640×432 pixels and set OVERSCAN_LEFT=OVERSCAN_RIGHT=40 and OVERSCAN_TOP=OVERSCAN_BOTTOM=24. A few non-coded rows and columns may appear on the display. Since the non-coded pixels are on the edge of the screen and similar to nearby pixels, the non-coded pixels may not be annoying to the viewer.

Figure 5:
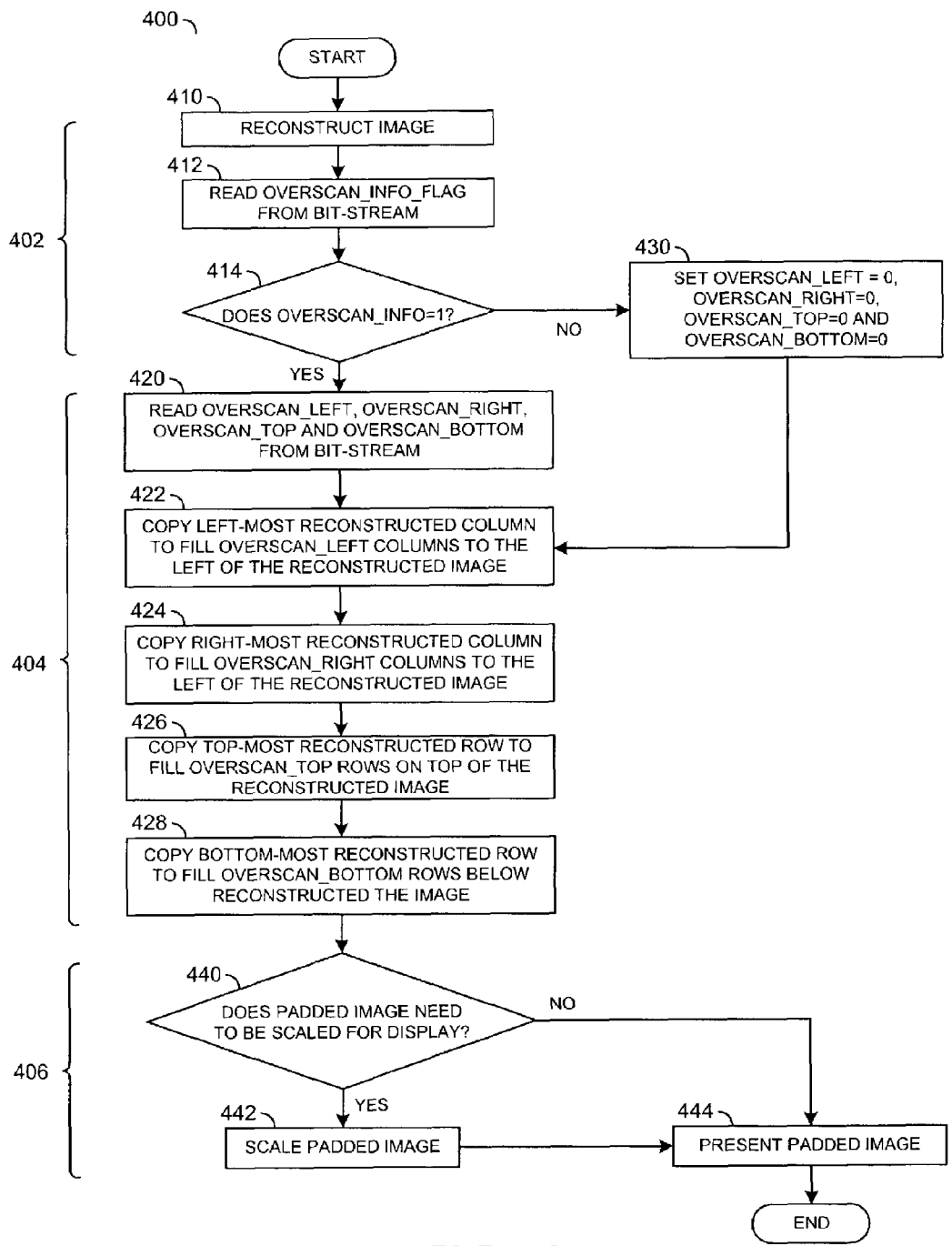
FIG. 5 is a flow diagram of an operation of an embodiment of the present invention.

Referring to FIG. 5, a flow diagram of a process 400 in accordance with the present invention is shown. The process 400 generally comprises an input portion 402, a processing portion 404 and an output portion 406. The input portion 402 generally comprises a state 410, a state 412 and a decision state 414. The state 410 generally reconstructs an input image. The state 412 generally reads an overscan flag (e.g., OVERSCAN-INFO) as received in the bit-stream BS or the overscan description OD. The decision state 414 generally determines if the flag OVERSCAN-INFO is set (e.g., 1) or not set (e.g., 0).

The processing portion 404 generally comprises a state 420, a state 422, a state 424, a state 426, a state 428 and a state 430. If the decision state 414 determines that the flag OVER-SCAN-INFO is equal to 1, the process 400 executes the state 420, the state 422, the state 424, the state 426 and the state 428. The particular order of the state 422, the state 424, the state 426 and the state 428 may be modified to meet the design criteria of a particular implementation. The state 420 reads the various overscan parameters (e.g., OVERSCAN_LEFT, OVERSCAN_RIGHT, OVERSCAN_TOP, and OVER-SCAN_BOTTOM) from the bit-stream BS or overscan description OD. While in the state 422, the process 400 copies the left-most reconstructive column to fill the columns defined by the parameter OVERSCAN_LEFT to the left of the reconstructive image. Similarly, in the state 424, the process 400 copies the right-most reconstructive column to fill the columns defined by the parameter OVERSCAN_RIGHT to the right of the reconstructive image. In the state 426, the process 400 generally copies the top-most reconstructive row to fill the rows defined by the parameter OVERSCAN_TOP on top of the reconstructed image. Similarly in the state 428, the process 400 copies the bottom-most reconstructive row to fill the rows defined by the parameter OVERSCAN_BOTTOM below the reconstructed image.

If the decision state 414 determines that the flag OVERSCAN INFO is not set, the process 400 may move to the state 430. In the state 430, the process 400 generally sets the overscan parameters to zero. The process 400 may then move to the state 422.

The output portion 406 generally comprises a decision state 440, a state 442 and a state 444. After the processing section 404, the decision state 440 determines if the padded image needs to be scaled prior to being presented for display by the state 444. The padded image may be the reconstructed image that has been extended by (OVERSCAN_LEFT+ OVERSCAN_RIGHT) columns and (OVERSCAN_TOP+ OVERSCAN_BOTTOM) rows. If the image does need scaling, the process 400 moves to the state 442. In the state 442, the process 400 scales the padded image and then displays the padded image in the state 444. If the decision state 440 determines that the padded image does not need scaling, the process 400 may move to the state 444 to display the image.

The function performed by the flow diagram of FIG. 5 may be implemented using a conventional general purpose digital computer programmed according to the teachings of the present specification, as will be apparent to those skilled in the relevant art(s). Appropriate software coding may readily be prepared by skilled programmers based on the teachings of the present disclosure, as will also be apparent to those skilled in the relevant art(s).

The present invention may also be implemented by the preparation of custom silicon chips, ASICs, FPGAs, or by interconnecting an appropriate network of conventional component circuits, as is described herein, modifications of which will be readily apparent to those skilled in the art(s).

The present invention thus may also include a computer product which may be a storage medium including instructions which may be used to program a computer to perform a process in accordance with the present invention. The storage medium may include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for decoding a digital video bit-stream comprising the steps of:
   (A) receiving said digital video bit-stream containing image information; and
   (B) receiving one or more overscan parameters, wherein said one or more overscan parameters describe one or more dimensions of an overscan region absent from said digital video bit-stream.

2. The method according to claim 1, wherein said overscan region comprises an area adjacent to one or more edges of an image reconstructed from said image information in said digital video bit-stream.

3. The method according to claim 2, wherein said one or more overscan parameters comprise at least one of:
   an overscan flag;
   a first value representing a number of rows to be added along a top edge of said image;
   a second value representing a number of rows to be added along a bottom edge of said image;
   a third value representing a number of columns to be added along a left edge of said image; and
   a fourth value representing a number of columns to be added along a right edge of said image.

4. The method according to claim 1, further comprising the step of:
   filling said overscan region with pixel data.

5. The method according to claim 4, wherein the step of filling said overscan region comprises the sub-step of:
   reading part of one or more images reconstructed from the digital video bit-stream to obtain said pixel data.

6. The method according to claim 5, wherein at least one pixel is copied from a picture region of said one or more images to said overscan region.

7. A method for encoding a digital video bit-stream comprising the steps of:
   (A) extracting a picture region in an image;
   (B) generating said digital video bit-stream containing encoded image data for said picture region in said image and generating one or more overscan parameters, wherein said one or more overscan parameters describe one or more dimensions of an overscan region absent from said digital video bit-stream; and
   (C) presenting said digital video bit-stream and said one or more overscan parameters.

8. The method according to claim 7, wherein said overscan region comprises an area adjacent to one or more edges of said picture region.

9. The method according to claim 7, wherein said one or more overscan parameters comprise at least one of:
   an overscan flag;
   a first value representing a number of rows adjacent a top edge of said picture region;
   a second value representing a number of rows adjacent a bottom edge of said picture region;
   a third value representing a number of columns adjacent a left edge of said picture region; and
   a fourth value representing a number of columns adjacent a right edge of said picture region.

10. The method according to claim 1, wherein the one or more overscan parameters are multiplexed into said digital video bit-stream.

11. The method according to claim 10, wherein the one or more overscan parameters are part of a video usability information (VUI) header.

12. The method according to claim 1, wherein said one or more overscan parameters are presented separately from said digital video bit-stream.

13. The method according to claim 3, wherein said first, said second, said third and said fourth values are expressed as unsigned integer Exp-Golumb-coded syntax elements.

14. The method according to claim 3, wherein said overscan flag has a first state indicating that default values for the overscan parameters should be used and a second state indicating that the overscan parameters are being sent.

15. The method according to claim 1, wherein said digital video bit-stream is H.264 standard compliant.

16. The method according to claim 15, wherein said overscan parameters are sent as part of pan-and-scan fields.

17. The method according to claim 2, wherein each of said one or more overscan parameters provides an offset from an outer edge of the overscan region as measured from a corresponding edge of the reconstructed image.

18. The method according to claim 1, wherein said one or more overscan parameters provide an offset to an inner edge of the overscan region as measured from a corresponding outer edge of a full image.

19. The method according to claim 1, further comprising the steps of:
   decoding said image information in said digital video bit-stream to generate a reconstructed picture region; and
   padding said reconstructed picture region based on said one or more overscan parameters to generate a reconstructed full image.

20. The method according to claim 19, further comprising the step of scaling said reconstructed full image.

21. The method according to claim 7, further comprising the step of multiplexing the one or more overscan parameters into said digital video bit-stream.

22. The method according to claim 21, wherein the one or more overscan parameters are part of a video usability information (VUI) header.

23. The method according to claim 7, further comprising the step of presenting the one or more overscan parameters separately from said digital video bit-stream.

24. The method according to claim 9, wherein said first, said second, said third and said fourth values are expressed as unsigned integer Exp-Golumb-coded syntax elements.

25. The method according to claim 9, wherein said overscan flag has a first state indicating that default values for the overscan parameters should be used and a second state indicating that the overscan parameters are being sent.

26. The method according to claim 7, wherein said digital video bit-stream is H.264 standard compliant.

27. The method according to claim 26, wherein said overscan parameters are sent as part of pan-and-scan fields.

28. The method according to claim 7, wherein the step of generating said one or more overscan parameters comprises assigning a value representing an offset from an outer edge of the overscan region as measured from a corresponding edge of the picture region to each of the one or more overscan parameters.

29. The method according to claim 7, wherein the step of generating said one or more overscan parameters comprises assigning a value representing an offset to an inner edge of the overscan region as measured from a corresponding outer edge of the image to each of the one or more overscan parameters.

* * * * *